United States Patent
Rhodes

(10) Patent No.: US 9,381,768 B2
(45) Date of Patent: Jul. 5, 2016

(54) HAND-HELD DRY-ERASE BOARD SYSTEM

(71) Applicant: Julia M. Rhodes, Sonora, CA (US)

(72) Inventor: Julia M. Rhodes, Sonora, CA (US)

(73) Assignee: The Julia Marie Rhodes 2010 Revocable Trust, Sonora, CA (US)

( * ) Notice: Subject to any disclaimer, the term of this patent is extended or adjusted under 35 U.S.C. 154(b) by 186 days.

(21) Appl. No.: 14/061,329

(22) Filed: Oct. 23, 2013

(65) Prior Publication Data

US 2014/0051058 A1    Feb. 20, 2014

Related U.S. Application Data

(63) Continuation-in-part of application No. 12/798,359, filed on Apr. 2, 2010, now Pat. No. 8,591,131, and a continuation-in-part of application No. 11/535,114, filed on Sep. 26, 2006, now Pat. No. 7,717,636.

(51) Int. Cl.

| | |
|---|---|
| B43K 29/00 | (2006.01) |
| B43L 1/00 | (2006.01) |
| B43K 23/00 | (2006.01) |
| B43K 23/08 | (2006.01) |
| B43K 29/02 | (2006.01) |
| B43L 13/00 | (2006.01) |
| B43L 19/00 | (2006.01) |
| G09B 3/00 | (2006.01) |
| B43L 1/12 | (2006.01) |

(52) U.S. Cl.
CPC ................. *B43L 1/00* (2013.01); *B43K 23/001* (2013.01); *B43K 23/08* (2013.01); *B43K 29/02* (2013.01); *B43L 1/12* (2013.01); *B43L 13/005* (2013.01); *B43L 19/0068* (2013.01); *G09B 3/00* (2013.01)

(58) Field of Classification Search
CPC ........................... B43L 15/005; B43L 19/0068
USPC ............................. 401/195, 52, 131; 434/408
See application file for complete search history.

(56) References Cited

U.S. PATENT DOCUMENTS

| | | |
|---|---|---|
| 4,875,591 A | 10/1989 | Mikesell |
| 5,072,483 A | 12/1991 | Durand |
| 5,263,866 A | 11/1993 | Campbell |
| 5,294,114 A | 3/1994 | Stillinger |
| 5,432,973 A | 7/1995 | Wagner et al. |
| 5,599,189 A | 2/1997 | Kees et al. |
| 5,626,478 A | 5/1997 | Gatlin |

(Continued)

FOREIGN PATENT DOCUMENTS

GB    2 296 898    7/1996

OTHER PUBLICATIONS

European Search Report dated Nov. 26, 2009.

(Continued)

*Primary Examiner* — Jennifer C Chiang
(74) *Attorney, Agent, or Firm* — Williams Mullen, PC; M. Bruce Harper

(57) ABSTRACT

A hand-held dry-erase system for communication is provided, with application in education, healthcare, or other fields. A writing instrument may be stored in the handle of a portable dry-erase board. The hand-held dry-erase board system includes a frame including a writable surface, a handle, wherein the handle includes an upper end and a lower end and wherein the upper end of the handle is attached to the frame enabling a power grip. A clip may be attached to the handle to secure a marker. The writable surface may be transparent, and removable substrates may be included.

26 Claims, 15 Drawing Sheets

(56) References Cited

U.S. PATENT DOCUMENTS

| | | |
|---|---|---|
| 5,743,414 A | 4/1998 | Baudino |
| 5,855,442 A | 1/1999 | Keller |
| 5,871,294 A | 2/1999 | Turner |
| 5,957,603 A | 9/1999 | Bell |
| 5,987,794 A | 11/1999 | Lavi et al. |
| 5,997,309 A | 12/1999 | Metheny et al. |
| 6,265,074 B1 | 7/2001 | Shah et al. |
| 6,347,898 B1 | 2/2002 | Rhodes et al. |
| 6,595,143 B2 | 7/2003 | London |
| 6,626,675 B1 | 9/2003 | Webber et al. |
| 6,666,424 B2 | 12/2003 | Richardson |
| D496,068 S | 9/2004 | Mandel |
| 6,837,715 B2 | 1/2005 | Beno |
| 6,866,516 B2 | 3/2005 | Smith et al. |
| 6,893,266 B2 | 5/2005 | Donelan |
| 6,932,531 B2 | 8/2005 | Marschand et al. |
| 7,350,995 B1 | 4/2008 | Rhodes |
| 7,717,636 B2 | 5/2010 | Rhodes |
| 8,591,131 B2 * | 11/2013 | Rhodes ................ B43K 23/001 401/131 |

OTHER PUBLICATIONS

European Application No. 002272260-001/004. Office for Harmonization in the International Market (confirmation of filing 6 pages).

* cited by examiner

HAND-HELD DRY-ERASE BOARD SYSTEM

CROSS REFERENCE TO RELATED APPLICATIONS

This application is a continuation-in-part of U.S. application Ser. No. 12/798,359, filed Apr. 2, 2010, which is a continuation-in-part of U.S. application Ser. No. 11/535,114, filed Sep. 26, 2006, which has issued as U.S. Pat. No. 7,717,636, which is a continuation of U.S. application Ser. No. 11/534,701, filed Sep. 25, 2006, now abandoned, which claimed the benefit of priority under Title 35, United States Code, Section 119(e) to U.S. provisional patent application Ser. No. 60/720,634 filed Sep. 26, 2005. U.S. Application Ser. No. 60/720,634, Ser. No. 11/534,701, and Ser. No. 11/535,114 are all hereby incorporated in their totality by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to learning aids and more specifically it relates to a hand-held dry-erase board system for efficiently combining a dry-erase board, a marker and an eraser into one package.

2. Description of the Related Art

Any discussion of the related art throughout the specification should in no way be considered as an admission that such prior art is widely known or forms part of common general knowledge in the field.

Learning aids have been in use for years. Typically, learning aids have included items such as flashcards, small chalk boards and small dry-erase boards. When using flash-cards, a student or teacher will read the question on one side of the flashcard and, when ready, flip it over to read the answer. Portable chalk boards and dry-erase boards usually include a board along with a piece of chalk or dry-erase marker and then a separate eraser. The student or teacher may write a question on one side of the board and then either erase it, or if the board has two sides, flip it over to reveal the answer (providing the answer was previously written on the back).

A disadvantage with flashcards is that they are not usually able to be modified and are generally not written on. This can hinder the student's learning ability as the flash card may not adequately describe the solution to the given problem. Portable chalk boards pose the problem of leaving messy chalk dust and small pieces of chalk everywhere. Chalk boards can also be difficult to read from a distance (e.g., located at the back of a classroom). A problem with past portable dry-erase boards is that it can be cumbersome to carry around a separate board, marker and eraser simultaneously.

While these devices may be suitable for the particular purpose to which they address, they are not as suitable for efficiently combining a dry-erase board, a marker and an eraser into one package. Past chalk boards and dry-erase boards have posed a significant problem in that it can be very cumbersome to carry around a board, a marker or chalk and an eraser at one time.

In these respects, the hand-held dry-erase board system according to the present invention substantially departs from the conventional concepts and designs of the prior art, and in so doing provides an apparatus primarily developed for the purpose of efficiently combining a dry-erase board, a marker and an eraser into one convenient package.

BRIEF SUMMARY OF THE INVENTION

Disclosed is a hand-held writing system for use with a writing instrument, having a frame with a height along a Y-axis, a width along an X-axis, and a depth along a Z-axis, where the frame defines at least one substantially planar writable surface along a portion of the frame's height and width. Further, the frame defines a side surface along the frame's depth at a perimeter of the writable surface. There is a handle having at least one proximal end and at least one distal end, wherein the proximal end of the handle is attached to the frame at a point on the frame other than the substantially planar writable surface, with the at least one distal end extending unattached to the frame, i.e., substantially parallel to the Y-axis and forming an ergonomic gripping surface apart from the frame. The handle and ergonomic gripping surface are adapted to being encircled by a user's hand in a power grip. In this manner, the frame and the handle define a paddle-like shape.

The system may be configured so that the proximal end of the handle is attached to a bottom of the frame at a midpoint of the frame's width and the handle may be a substantially I-shaped member extending along the Y-axis. At least a portion of the handle may have substantially rounded corners capable of being encircled by the user's hand in a power grip. Optionally, the at least one substantially planar writable surface may be two opposing sides, with a common side surface, so as to form a first writable surface and a second writable surface on opposite sides of the frame (i.e., as of a paddle faces).

In some embodiments, at least a portion of the at least one writable surface may be substantially transparent. Some versions of such a hand-held writing system may be adapted for use with a substrate having a predetermined substrate height, width, depth, and a substrate presentation surface. In such embodiments, the system may have a substantially planar, flexible, transparent sleeve having an outer surface that is the at least one writable surface. This transparent sleeve may overlay the frame with an inner surface facing the frame, the sleeve an affixed edge portion affixed to the frame and a free edge portion that is un-affixed to the frame, the sleeve and the frame defining an internal compartment having a desired compartment-height, compartment-width, and compartment-depth greater than the substrate-height, substrate-width, and substrate-depth—i.e., to an extent that a substrate may be inserted therein. The free edge portion of the transparent sleeve and the frame may thus define an aperture in fluid communication with the internal compartment and configured for insertion of the substrate through the aperture and into the internal compartment. When the substrate is inserted into the internal compartment with the presentation surface facing away from the frame, and substantially parallel with the at least one writable surface, the presentation surface of the substrate may thus be visible through the at least one writable surface.

In some embodiments, the perimeter of the writable surface adjacent to the aperture defines at least one access depression within the perimeter, i.e., along the X- and Y-axes, so as to provide access to a portion of the substrate after the substrate has been inserted through the aperture and into the internal compartment. The hand-held writing system may have a handle in which its maximum effective diameter is greater than an average depth of the frame, with the frame further comprises at least one stabilizing protrusion extending along the Z-axis for a desired distance substantially equivalent to the distance beyond the writable surface along the Z-axis of the handle at a point of maximum effective diameter. Such at least one stabilizing protrusion may be positioned on the perimeter of the writable surface at a point opposing the distal end of the handle.

In some embodiments of the system, in which the at least one substantially planar writable surface comprises two opposing sides having at least a portion of common perimeter along a plane substantially parallel with the X and Y-axes, the perimeter may optionally form a desired shape.

In another option, the hand-held writing system may be configured with a handle that has a substantially flat contact surface, which is positioned so as to rest between a thumb and index finger of a user gripping the handle. In some embodiments of the hand-held writing system: (i) the frame depth may have a thickness of about 0.25-1 inch; (ii) the handle may have a cross section diameter of about 1 inch to 2 inches; and/or (iii) the handle may have a height of about 4 inches to about 6 inches.

The writing instrument may be a dry-erase marker and the writable surface is comprised of a material suitable for writing upon with said dry-erase marker. Such a version of the system may further include a dry-erase eraser.

The system may be embodied or included within the form of a writing kit. For example, such a kit may have a hand held writing system for use with a writing instrument, and a tray, the tray having a tray bottom and at least one tray side, the tray bottom and at least one tray side defining a container with an open top, the tray bottom having an inner bottom surface and an outer bottom surface, the tray having a handle mount integrally affixed to the inner bottom surface and extending vertically, configured to engage with the handle so as to enable the handle and frame to be supported in a substantially vertical orientation from the tray.

In such an embodiment, as before, the system may include a frame with a height along a Y-axis, a width along an X-axis, and a depth along a Z-axis, wherein the frame defines at least one substantially planar writable surface along a portion of the frame's height and width. Further, such a frame may define a side surface along the frame's depth at a perimeter of the writable surface. There is a handle with at least one proximal end and at least one distal end, wherein the proximal end of the handle is attached to the frame at a point on the frame other than the substantially planar writable surface, with the at least one distal end extending unattached to the frame substantially parallel to the Y-axis and forming an ergonomic gripping surface apart from the frame. The handle and ergonomic gripping surface may be adapted to being encircled by a user's hand in a power grip, such that the frame and the handle define a paddle-like shape;

Embodiments of the kit may include a system with a handle that is attached to a bottom of the frame at a midpoint of the frame's width and the handle is a substantially I-shaped member extending along the Y-axis. At least a portion of the handle may have substantially rounded corners capable of being encircled by the user's hand in a power grip. Optionally, the at least one substantially planar writable surface comprises two opposing sides having a common side surface, so as to form a first writable surface and a second writable surface on opposite sides of the frame.

In some embodiments of the writing kit, at least a portion of the at least one writable surface is substantially transparent. In such versions, the kit may be adapted for use with a substrate having a predetermined substrate height, width, depth, and a substrate presentation surface. The handheld writing system may further include a substantially planar, flexible, transparent sleeve having an outer surface that is the at least one writable surface. The transparent sleeve may overlay the frame with an inner surface facing the frame, the sleeve having an affixed edge portion affixed to the frame and a free edge portion that is un-affixed to the frame. The sleeve and the frame may define an internal compartment having a desired compartment-height, compartment-width, and compartment-depth greater than the substrate-height, substrate-width, and substrate-depth. The free edge portion of the transparent sleeve and frame may define an aperture within the side surface, with the aperture being in fluid communication with the internal compartment. The substrate may be inserted through the aperture and into the internal compartment, so that when the substrate is inserted into the internal compartment with the presentation surface facing away from the frame and substantially parallel with the at least one writable surface, the internal compartment includes an internal presentation surface that is substantially parallel with the at least one writable surface, so that of the substrate is visible through the at least one writable surface.

Embodiments of the writing kit may include a dry-erase marker, where the writable surface is comprised of a material suitable for writing upon with said dry-erase marker. Optionally, the kit may include a dry-erase eraser.

In some embodiments, the open top of the tray may operably engage the frame so that the frame and tray mate, thus closing the open top of the tray.

The tray or system may define a storage receptacle for removable storage of a portable computer readable medium. In some embodiments, the writing kit or system may include a non-transient computer readable medium. Optionally, the handle may define a storage receptacle for removable storage of a portable computer readable medium. In other embodiments, a computer readable medium may be provided in the form of a readable code upon a substrate. The combination of low technology with high technology forms of communication tools can be particular versatile and effective as a form of augmentative and alternative communication. In this optional case, a dry erase communication enables (unaided) signing, while information technology enable storage and retrieval of additional (aided) messages or content. It is contemplated that the handle and frame of this system may incorporate a variety of information technologies within the scope of the present approach.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
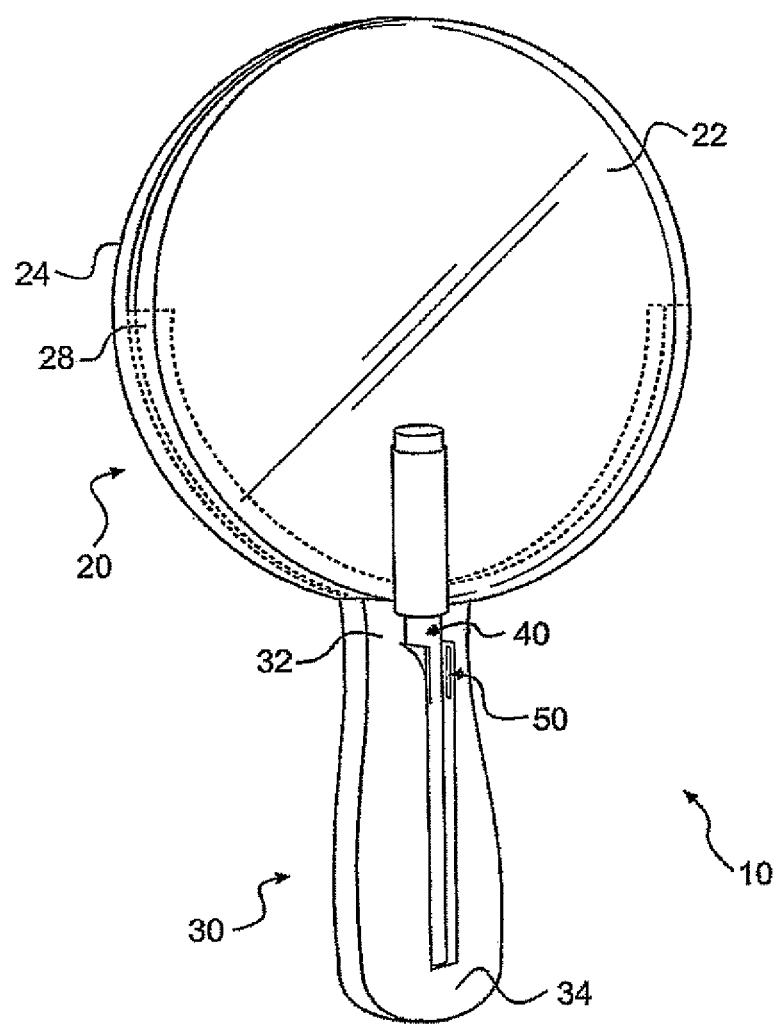
FIG. 1 is an upper perspective view, without a printable substrate.

Turning now descriptively to the drawings, in which similar reference characters denote similar elements throughout the several views, FIGS. 1 through 5, and 7 through 15 illustrate a hand-held dry-erase board system 10, which comprises a frame 20 including a substantially planar first writable surface 22, a handle 30, wherein the handle 30 includes an upper or proximal end 32 and a lower or distal end 34 and wherein the proximal end 32 of the handle 30 is attached to the frame 20. A clip 50, which may be used as a retainer, is attached to the handle 30 along the handle 30 axis and wherein the clip 50 secures a marker unit 40. Optionally, system 10 may also be provided in a writing kit form.

B. Frame

Figure 9:
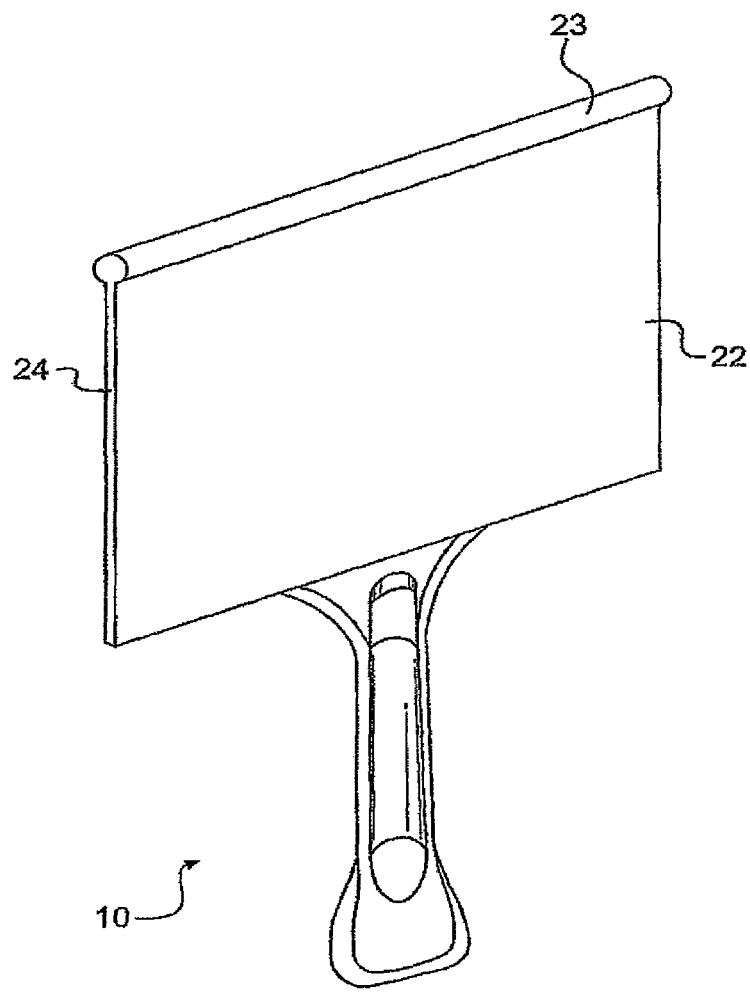
FIG. 9 is a perspective view of an embodiment with a single stabilizing projection.
Figure 10:
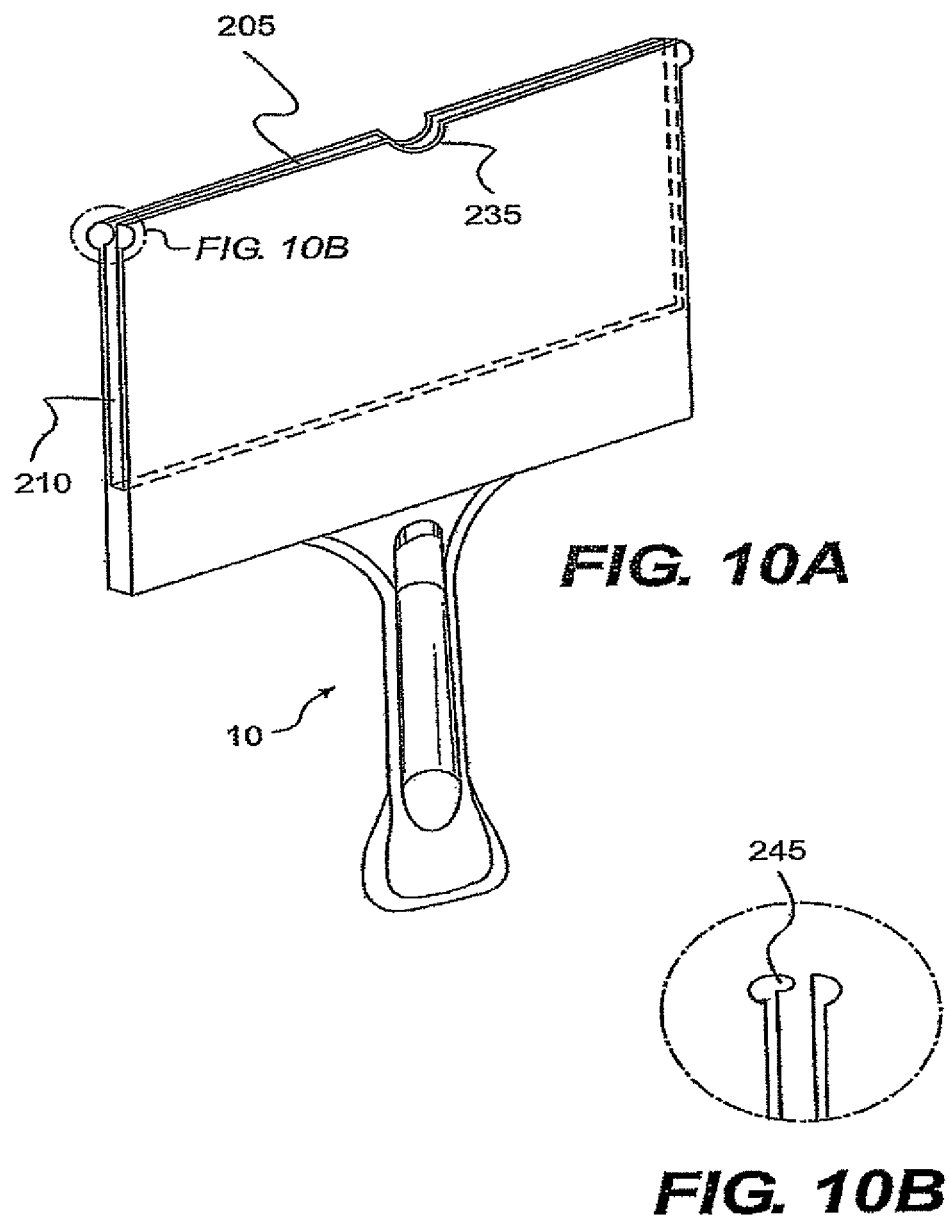
FIG. 10A is a perspective view of an embodiment with an access depression.
FIG. 10B is a detail of a retaining member.
Figure 11:
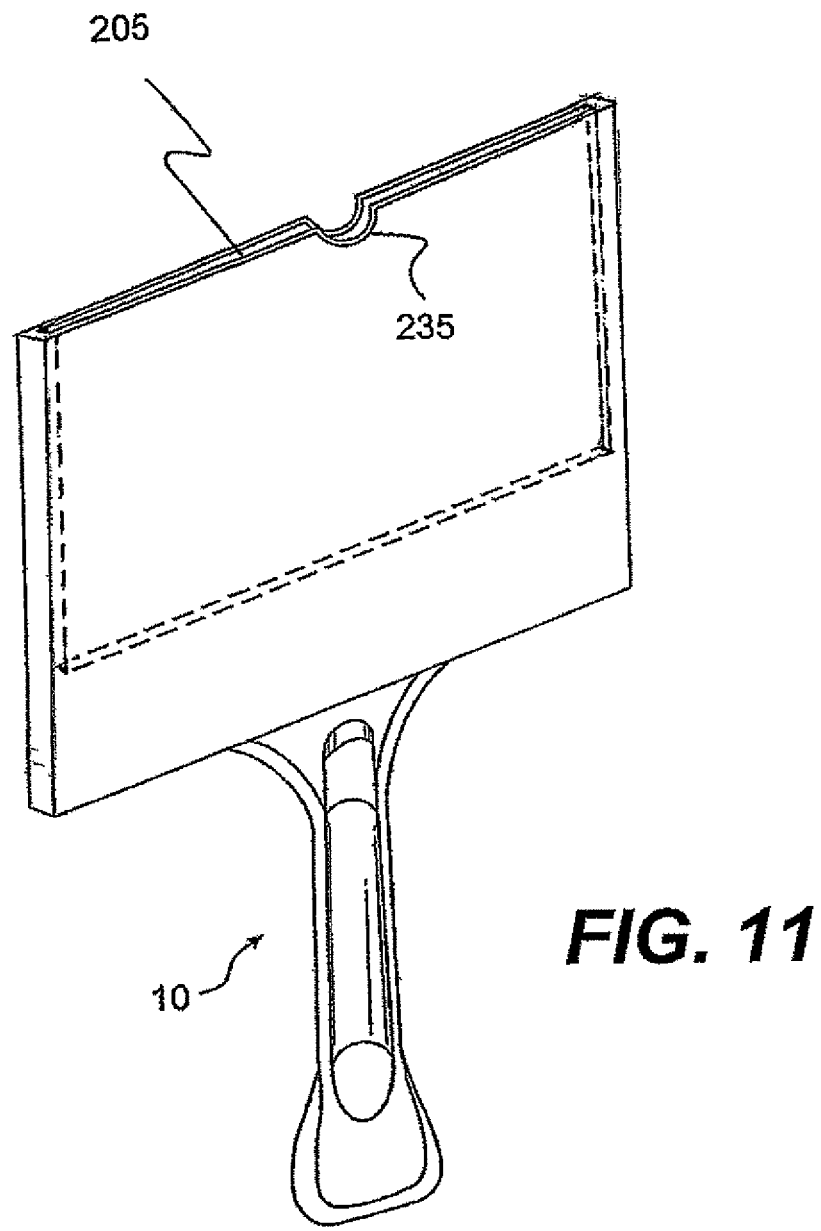
FIG. 11 is a perspective view of an embodiment with an access at the top of the frame and enclosed sides forming an internal compartment.

The frame 20 is preferably comprised of a circular or square structure and configuration as shown in FIGS. 1 through 4, with the shape of frame 20 and handle 30 similar to the familiar shape of a ping pong paddle. However it is appreciated that the frame 20 may be comprised of various shapes rather than the shown embodiment of a round paddle, such as but not limited to frame 20 that might be square, rectangular and triangular or thematically decoratively formed or where the perimeter forms a desired shape, though still with frame 20 and handle 30 in a general paddle-like configuration or shape (e.g., as shown in FIG. 9). Thematically decoratively formed refers to any shape that represents a silhouette, such as, but not limited to, a fruit, an animal or any structure identifiable by its outline. The frame 20 is preferably comprised of a stiff material (e.g., wood, masonite, plastic, etc.) and is suitable for holding a writable surface. The frame supports the first writable surface 22 and optionally a substantially planar second writable surface 24 on opposing sides of a common plane within the frame 20 surface edge perimeter 26 and an outside surface edge 28. The first writable surface 22 and second writable surface 24 in total thickness may be coplanar or more or less than the thickness of the frame 20.

Frame 20 may also be a substantially transparent material which would a user to peer through any writable surface 22, 24 to view a printable substrate 60 inserted within the frame 20. Substrate 60 may be a sheet or layer of printed matter, possibly in the form of a template or background that may underlay a writable surface. Alternatively, a writable surface may be an outer surface of a transparent film. The surface edge perimeter 26 is defined by the shape of the frame 20 in terms of an x-axis in a horizontal direction defining the width of the frame 20, a y-axis in a vertical direction defining the height of the frame and a z-axis in a horizontal direction perpendicular to both the x-axis and y-axis defining a depth of the frame 20. The depth of the frame is between 0.5 inches and 2.5 inches.

Figure 4:
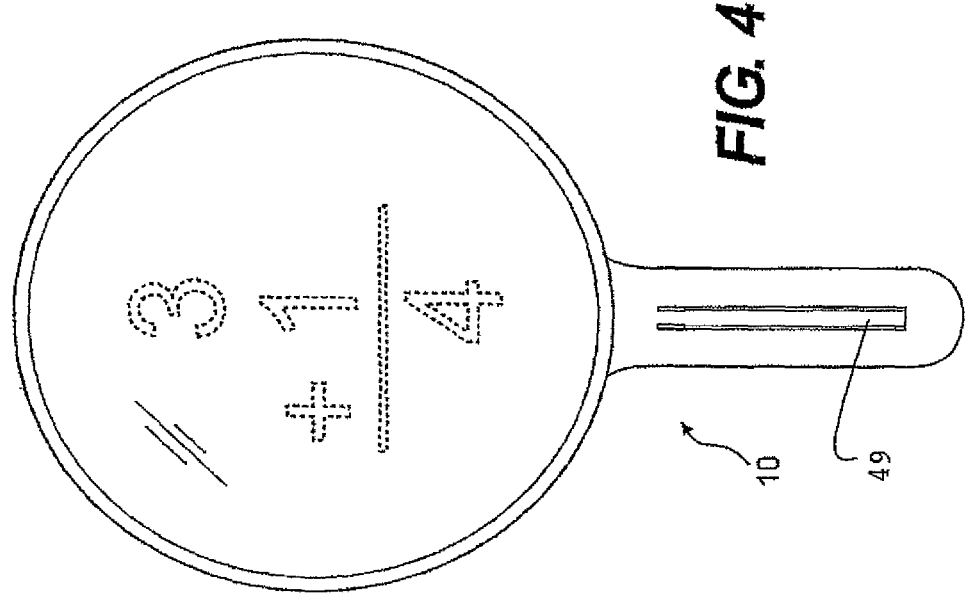
FIG. 4 is a rear view with a solution written on the second surface.
Figure 3:
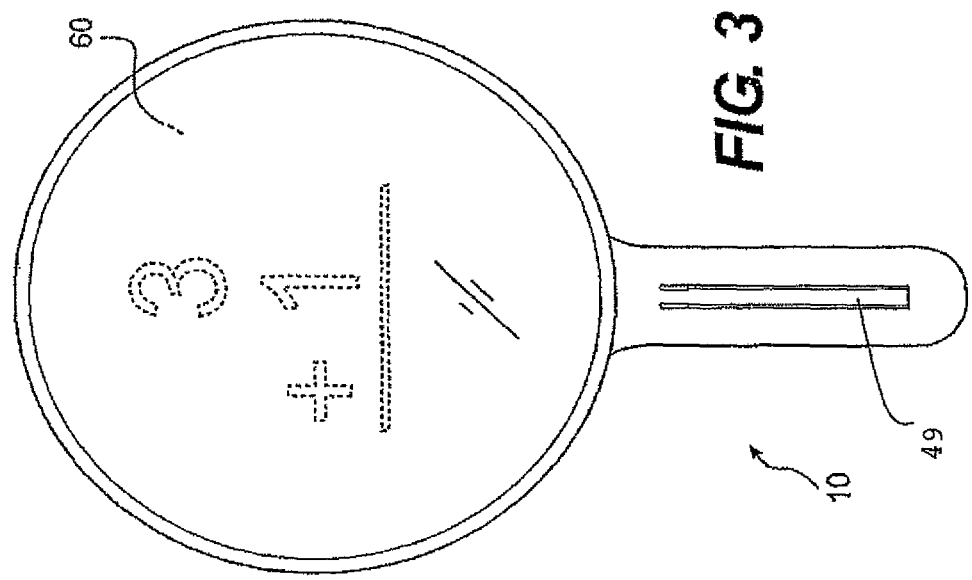
FIG. 3 is a front view with a question written on the first surface.

The first writable surface 22 and second writable surface 24 are preferably on opposite sides of and within the surface edge perimeter 26 of the frame 20, as shown in FIGS. 3 and 4. The first writable surface 22 and the second writable surface 24 are preferably of a substantially similar configuration having a similar surface edge perimeter. The first writable surface 22 and the second writable surface 24 are also of the same structure and configuration as the shape of the frame 20. The size and shape of the first writable surface 22 and the second writable surface 24 are similar, but slightly smaller in diameter and within the surface edge perimeter 26 of, the circular configuration shown of the frame 20.

The first writable surface 22 and the second writable surface 24 are preferably comprised of a smooth laminate coating (e.g., film, paper, vinyl, porcelain, epoxy-coated film, ultraviolet cured liquid, varnish, etc.) or any coating that can be written upon and erased with dry-erase markers and erasers, as shown in FIGS. 3 and 4. The coating used for the first writable surface 22 and the second writable surface 24 is preferably substantially similar. The first writable surface 22 and the second writable surface 24 may also have a preprinted outline of any form of indicia (e.g., graph, cursive lines, basketball court, line up of football players, etc.)

The first writable surface 22 and the second writable surface 24 may be substantially transparent. A substantially transparent surface may be defined as a surface in which an object on the opposite side from the viewer may be visibly distinguished. This may include colored or optically translucent plastics. The transparent writable coating may also have a substantially transparent writable coating which may be removeably attached and may have a preprinted outline of any form of indicia.

The frame 20 (when at least a portion being substantially transparent) may have at least one internal compartment 205 of a desired height and width and depth within the depth of the frame 20 in fluid communication with an aperture 210 of a desired height and width and depth defining one or more perimeter outside surface edge 215 such as a front surface edge 220 and a rear surface edge 225 bordering the aperture 210. The at least one aperture 210 extends from a point on a first perimeter outside surface edge 217 laterally within the depth of the frame 20 to a second point on the perimeter outside surface edge 218 wherein the aperture 210 provides an opening to enable the insertion of the printable substrate 60 and is defined by the point on the perimeter first outside surface edge 217 to the second point on an outside surface edge 218 and extending longitudinally within the depth of the frame 20 to a third point on the perimeter outside surface edge 219 substantially away from the handle 30. Outside surface edge 217 and outside surface edge 218 are separated by an aperture 210 depth along a z-axis direction. In one embodiment at least a portion of the aperture 210 depth is less than the internal compartment 205 depth, configured so as to removably retain a substrate 60 within the internal compartment 205 after the substrate 60 has been inserted through the aperture 210 and into the internal compartment 205. The retaining member 245 also allows the release of the substrate 60 to enabling the removal of the substrate. The retaining member 245 may alternatively be in the form of one or more end caps or clips that could be slid over the aperture 210 or, as in the case of FIG. 10A, on one or more sides or over the top of the frame 20 at a desired point.

The aperture 210 is in fluid communication with the internal compartment 205 within the depth of the frame 20. The aperture 210 also defines at least a front outside surface edge 220 and rear outside surface edge 225 as determined by the frame 20 shape. The aperture 210 allows for the insertion of at least one printable substrate 60 into the internal compartment 205. Internal to the aperture 210 is an internal presentation surface 240 in which the printable substrate 60 surface rests and allows for visualization of the printable substrate 60. In essence internal presentation surface 240 is substantially parallel with the planar writable surface 22, 24, so that the printable substrate 60 is visible through the planar writable surface 22, 24. The internal presentation surface 240 may be the front, back or both of the internal surfaces of the aperture 210 or some other structure that operates as a surface to support the printable substrate 60 when inserted into the aperture 60 and internal compartment 205. An aspect of this support is that the printable substrate 60 is supported in a position to be reasonably visible through at least a portion of the at least one writable surface 22, 24 that is substantially transparent. The aperture 210 extends from a first point on the side surface 28 to a second point on the side surface 28 where the aperture 210 provides an opening of a desired size and shape within the side surface 28 for access to the internal compartment 205. The aperture 210 has an aperture-width along the X-axis that is equal to or less than the compartment-width and is sufficient for the insertion of a substrate 60 having a predetermined substrate-width through the aperture 210 and into the internal compartment 205. As illustrated in FIG. 10A, the aperture 210 may be open on the sides or may simply be an internal compartment 205 defined by closed sides of the frame 20, allowing for substrate 60 to be inserted and removed through the aperture 210 on the top of the frame 20.

In some embodiments adapted for use with a substrate 60, but where the transparent at least one writable surface 22, 24 is the outer surface of a substantially planar, flexible transparent sleeve, examples of which are shown in FIG. 12-15. In these figures, a transparent writable surface 22 is an outer surface of a transparent sleeve overlaying the frame 20 with an inner surface facing the frame 20. As shown in particular in FIGS. 13 and 15, the sleeve may have an affixed edge portion affixed to the frame 20 and a free edge portion 220 that is un-affixed to the frame 20 (i.e., unaffixed to outside surface edge 225). The sleeve and the frame 20 defining an internal compartment 205 having a desired compartment-height, compartment-width, and compartment-depth greater than the substrate-height, substrate-width, and substrate-depth of substrate 60 (see, e.g., FIG. 12).

Figure 12:
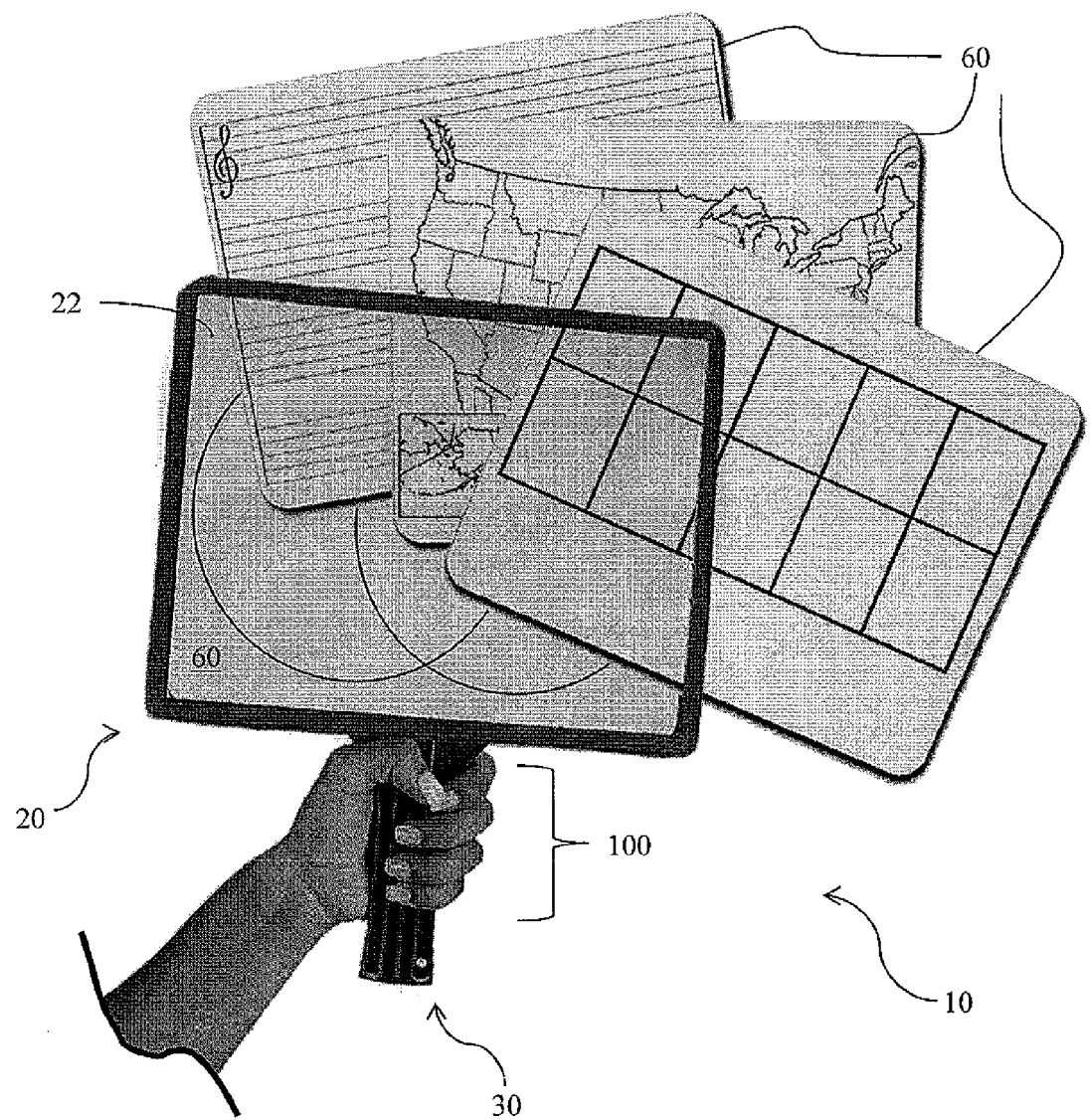
FIG. 12 is a front view of an embodiment of the system in use, showing a power grip as well as several substrates.
Figure 13:
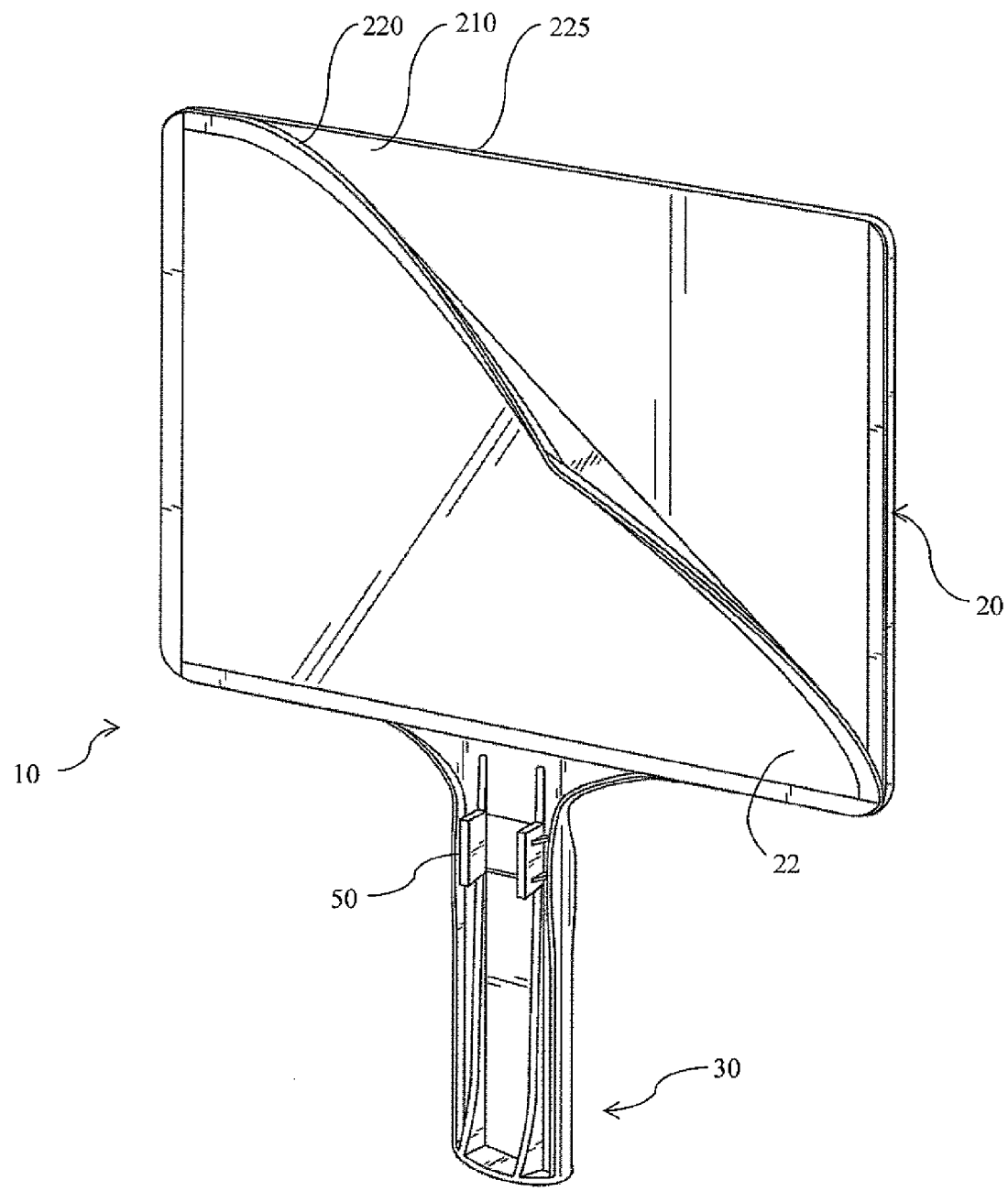
FIG. 13 is a view of an embodiment showing transparent sleeve with an outer surface that is the at least one writable surface.
Figure 14:
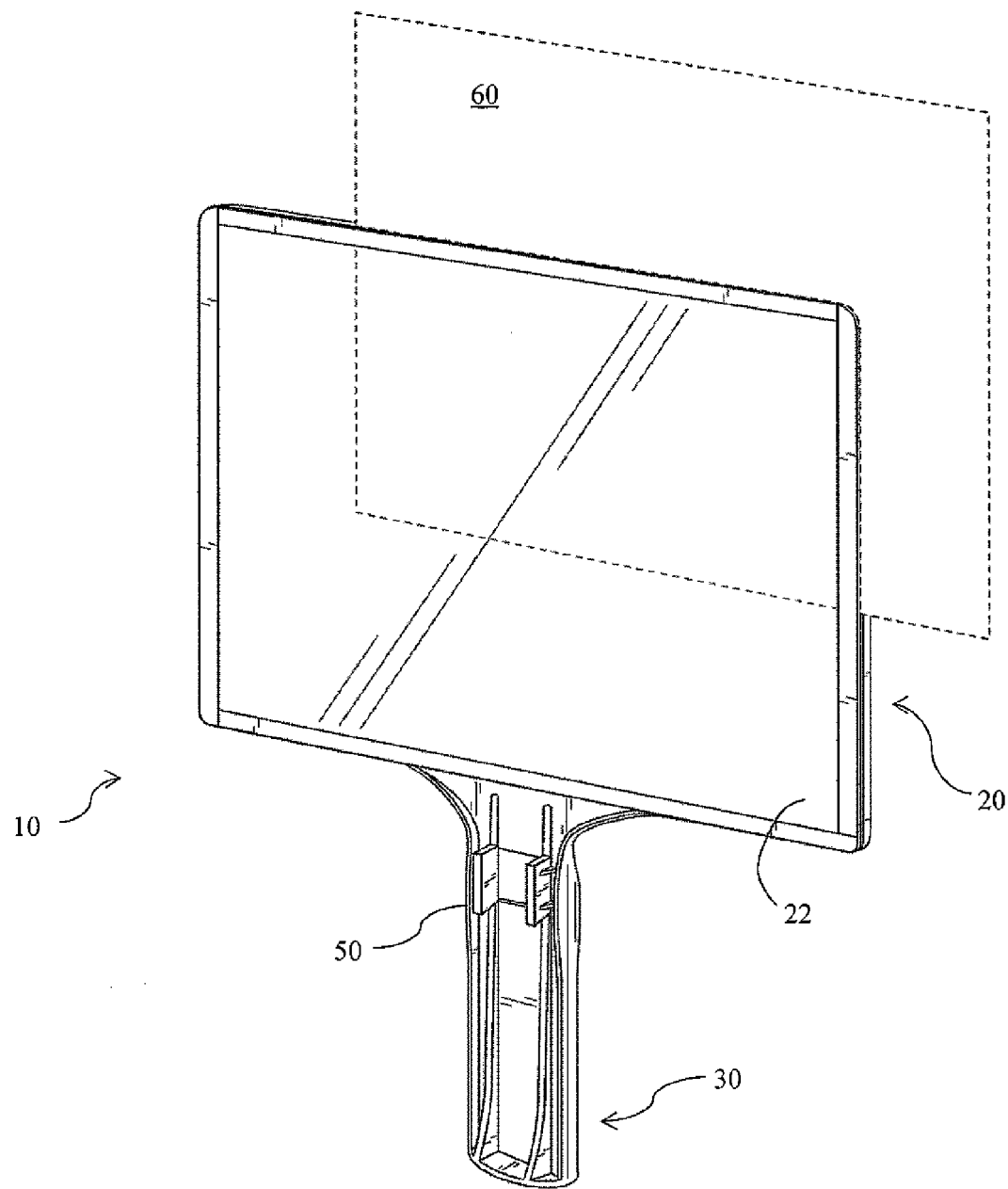
FIG. 14 is another view of an embodiment of the system with insertion of a substrate.
Figure 15:
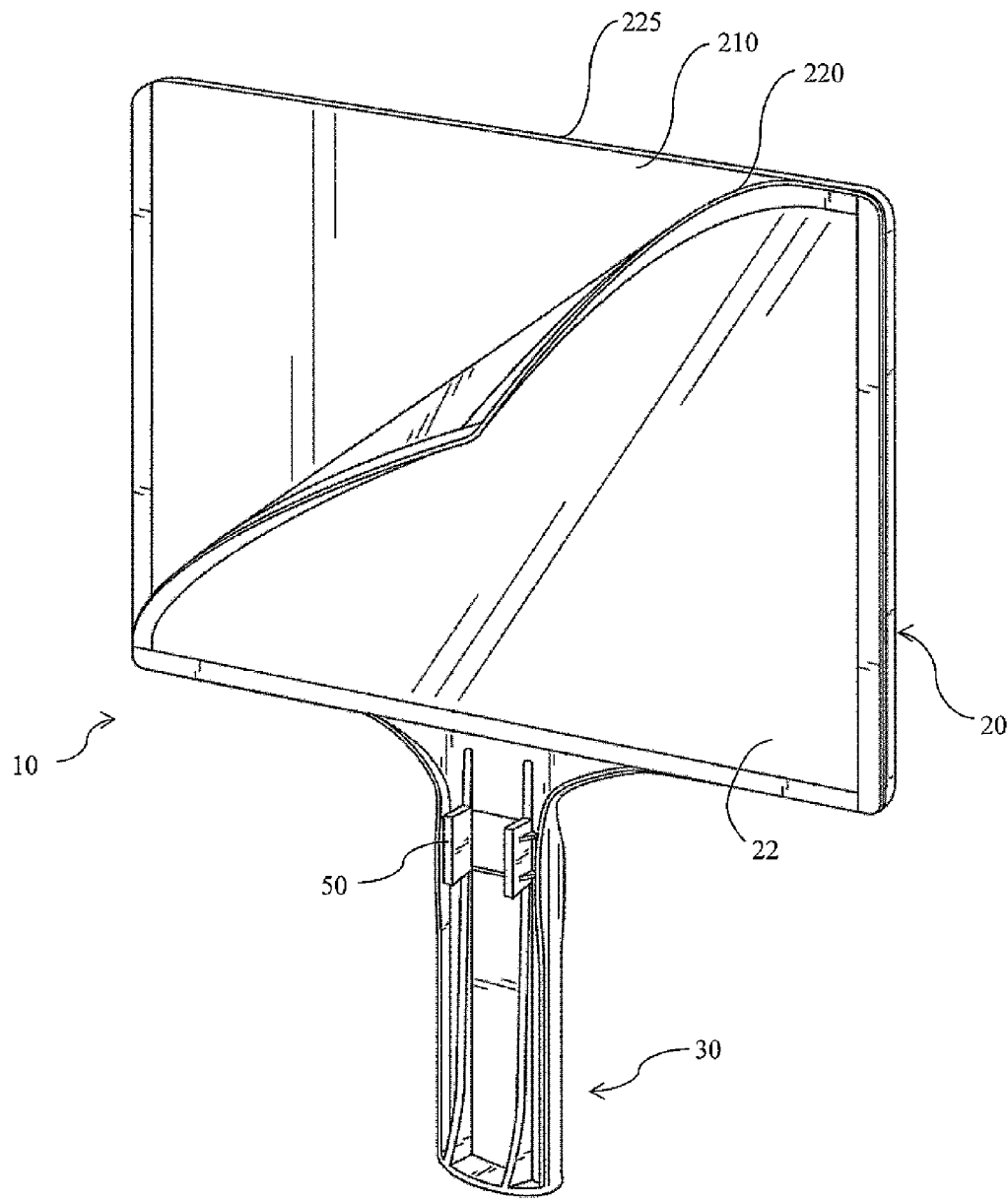
FIG. 15 is a front view of an embodiment of the system.

In FIGS. 13 and 15, a free edge portion 220 of the transparent sleeve and the frame 20 define an aperture 210 in fluid communication with the internal compartment 205 and configured for insertion of the substrate 60 through the aperture 210 and into the internal compartment 205 (see FIG. 14). When a substrate 60 is inserted into the internal compartment 205 with a presentation surface facing away from the frame 20 and substantially parallel with the at least one writable surface 22, the presentation surface of the substrate 60 is visible through the at least one writable surface 22 (see FIGS. 12 and 14).

As shown in FIG. 10B, the frame 20 may have a retaining member 245 within the aperture 210 for restraining, retaining or blocking the printable substrate 60, preventing it from shifting or falling out. The retaining member 245 may be a type of blocking structure such as flaps with buttons, snaps, or other fastener, toggles, plugs, end caps, hook and loop fasteners, snaps, elastic straps or gum bands, and otherwise adjustable members. The retaining member 245 (FIG. 8) may also be a gripping structure to include clips, clamps, binder clips, semi permanent adhesive, friction points, buttons, etc.

The frame 20 also may have an access depression 235 (FIG. 10A) adjacent to the perimeter to allow for removal of the printable substrate 60 via the aperture 210 and from the internal compartment 205. The access depression 235 acts essentially as a finger notch for inserting the user's finger and thumb substantially on each side of the printable substrate 60 and allows the user to grasp the printable substrate 60 for insertion or removal. The access depression 235 on the perimeter may also extend into either or both writable surfaces 22, 24.

The frame 20 may have at least one stabilizing protrusion 23 on the surface edge perimeter 26 which allow for the hand-held dry-erase board system 10 to be laid down on a horizontal or vertical surface keeping the first and second writable surface 22, 24 to remain separate from the horizontal or vertical surface in order to ensure the written image remains legible. The stabilizing protrusion 23 is essentially the same or equivalent thickness as the proximal end 32 and distal end 34 of the handle 30 with the protrusion height beyond that of the first and second writable surfaces 22, 24. The stabilizing protrusions 23 prevent the written information from coming in contact with objects on the surface and from becoming illegible by contact with any object on the horizontal or vertical surface. At least one stabilizing protrusion 23 is typically located away from the handle.

C. Handle

The shape and configuration of handle 30 are important ergonomic considerations. The inventor has discovered that the shape of handle 30, along with its relation to the frame 20 (with first writable surface 22 and the second writable surface 24) affects usability. Preferably, hand-held dry-erase board system 10 is suitable for single handed operation that permits display of frame 20. In some embodiments, this means a user may use a single hand to alternatively display the first writable surface 22 and the second writable surface 24. For clarity, not any handle shape will produce such results. A shape of handle 30 that is suitable for a pistol grip, for example, without additional structural accommodation would permit the display of only a single writable surface.

Instead, for some embodiments a desirable ergonomic arrangement of handle 30 is one that permits a power grip. In a power grip, the fingers may wrap around the handle 30 in one direction, while the thumb may wrap around the handle 30 in the other direction, so that handle 30 is generally parallel to the knuckles as shown in FIG. 12. In many embodiments, the weight of the system 10 is such that a user might easily rotate such a handle 30 within the hand to alternate between first and second writable surfaces 22, 24. In particular, a power grip embodiment of handle 30 in a paddle shaped frame 20 also permits twisting of the wrist to display both sides of frame 20. Of course, structure not intended as a handle is unlikely to enable such function.

The ability of a student to communicate using the system 10 in this manner uniquely supports use of a new practical teaching methodology referred to here as Dynamic Formative Assessment. Dynamic Formative Assessment is the intentional and systematic incorporation of real-time feedback into teaching, so that a teacher may adjust the ongoing teaching to address differences or deviations from a desired instructional outcome. The word "dynamic" is meant to convey that the teacher is able, in real time, to alter content or approach to address an instructional need. For example, a teacher might, in the course of instruction, decide to review a concept with a subset of a class after that subset had shown lack of comprehension of that concept based on the answers displayed using system 10. The teacher is able to assess dynamically the learning or cognition from a previous lesson. In this way, Dynamic Formative Assessment may be considered a recursive or cybernetic process, as opposed to a linear or straight presentation of information.

Similarly, system 10 is well suited for use in the medical methods of shared decision making. Shared decision making may be considered to be a process in which a patient's priorities and goals are considered by the provider, along with medical evidence in the decision making process. One aspect of shared decision making is referred to as the "teach back" technique. For example, a provider might ask a patient if the patient was able to describe a proposed treatment. If the patient is unable to describe the treatment correctly, then the provider may use this situation as an occasion for the provider to re-teach the description of the proposed treatment. A caregiver may ask a patient to write down a medication regimen, for example. In addition, a patient may use system 10 to illustrate graphically some aspect of the proposed treatment. Further, should a patient be unable to speak, the patient may be able to communicate using system 10.

The handle 30 is preferably comprised of a material as to be easily gripped by a user (e.g., dense foam, plastic, rubber, etc.), as shown in FIGS. 1 through 5. The handle 30 is preferably an integrally formed structure with the frame 20 where the proximal end 32 is attached to the outer perimeter 28 at a point on the frame 20; however the handle 30 may be comprised of a separate structure from the frame 20. The handle 30 is also preferably comprised of an ergonomic gripping design structure and configuration with a maximum effective diameter greater than the average depth of the frame 20 and may be thicker or thinner than the thickness of the frame 20, substantially circular or round in cross-section, or may be of various shapes from the proximal end 32 to the distal end 34. A section of the handle 30 may be substantially elliptical or oval in cross-section and have rounded corners as well. The distal end 34 extends unattached from the frame 20 forming an ergonomic gripping surface shape for a hand substantially within the plane of the first writable surface 22 and second writable surface 24 combined and may have a substantially flat contact surface positioned so as to rest between the thumb and the index finger of a user gripping the handle 30. The handle 30 is capable of being fully encircled by a user's hand. Handle 30 (or frame 20) may include a receptacle for a portable computer readable medium (not shown).

Figure 2:
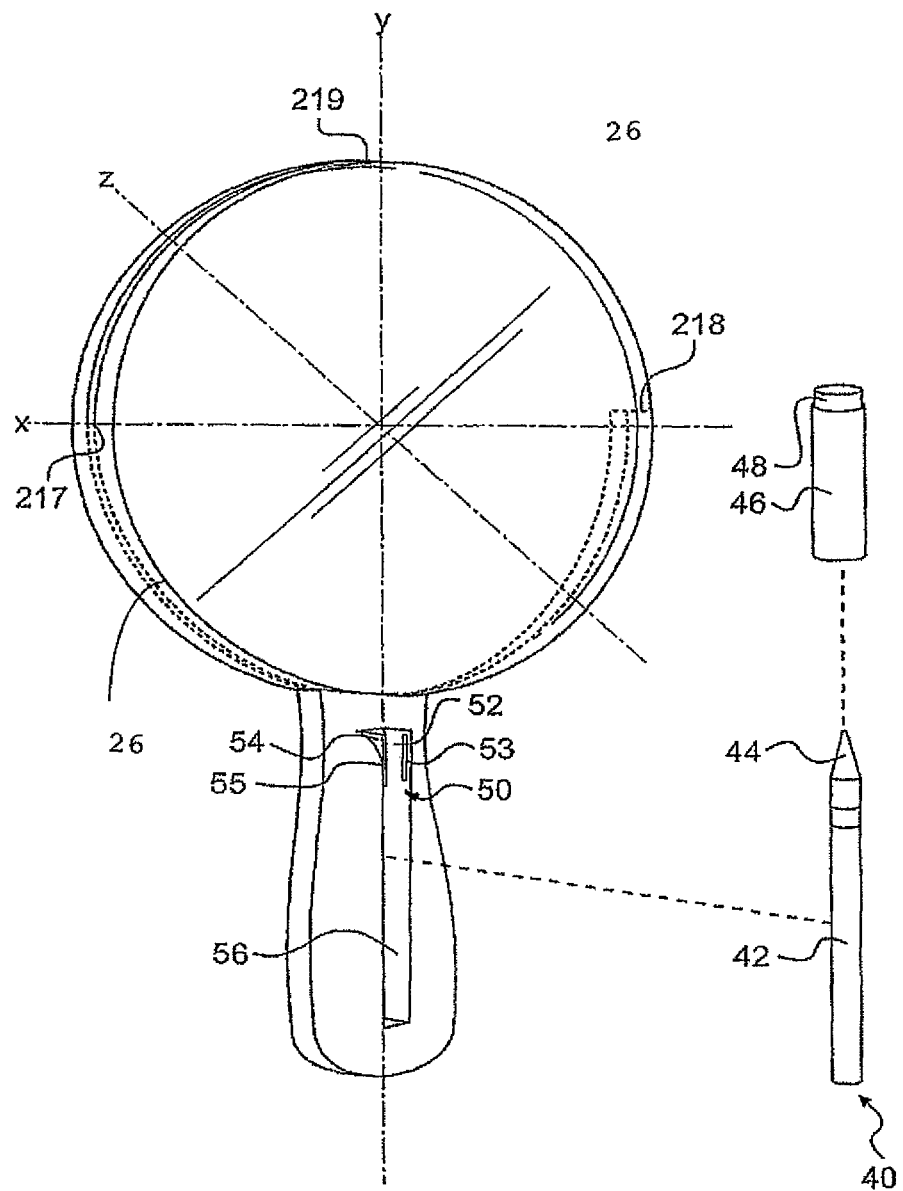
FIG. 2 is an upper exploded perspective view.
Figure 5:
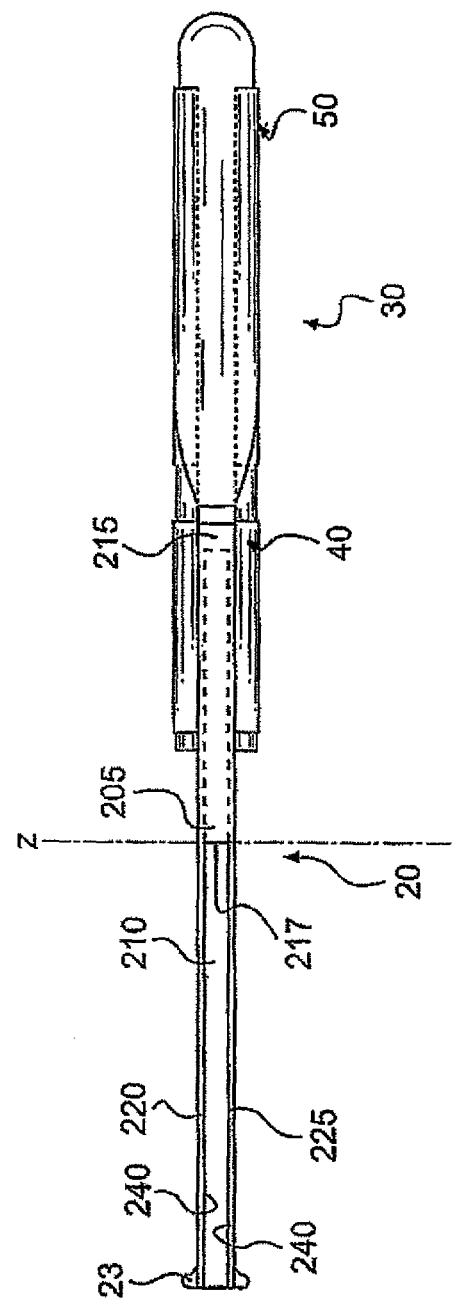
FIG. 5 is a side view with the marker attached to the handle.
Figure 6:
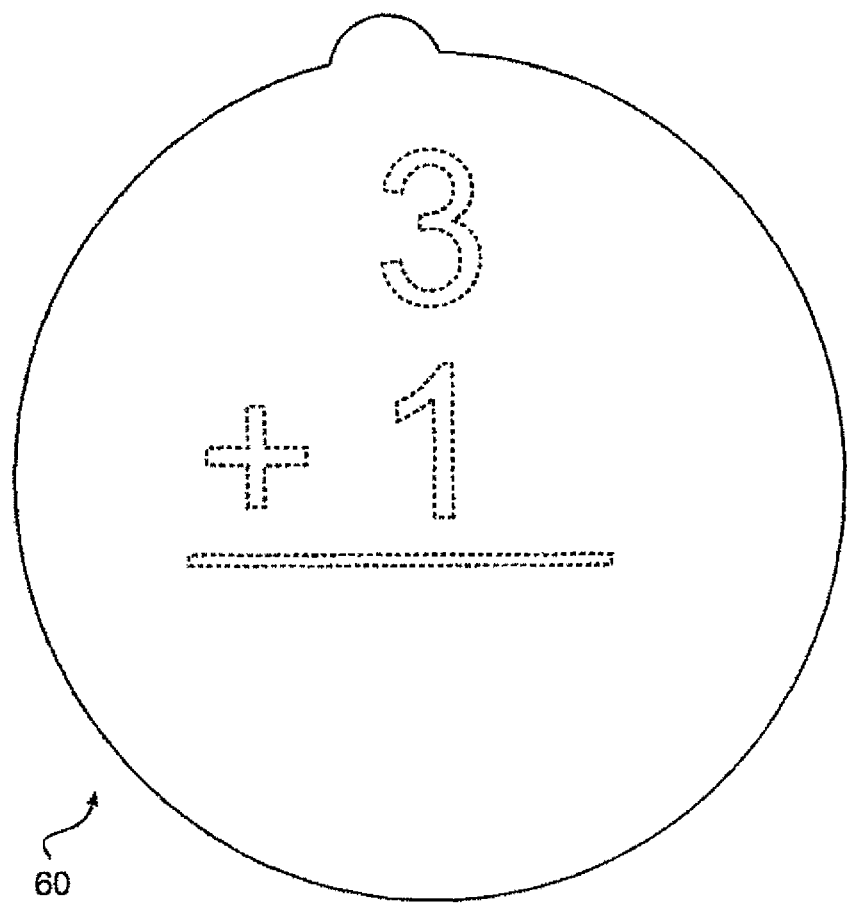
FIG. 6 is a front view of a printable substrate with information.
Figure 7:
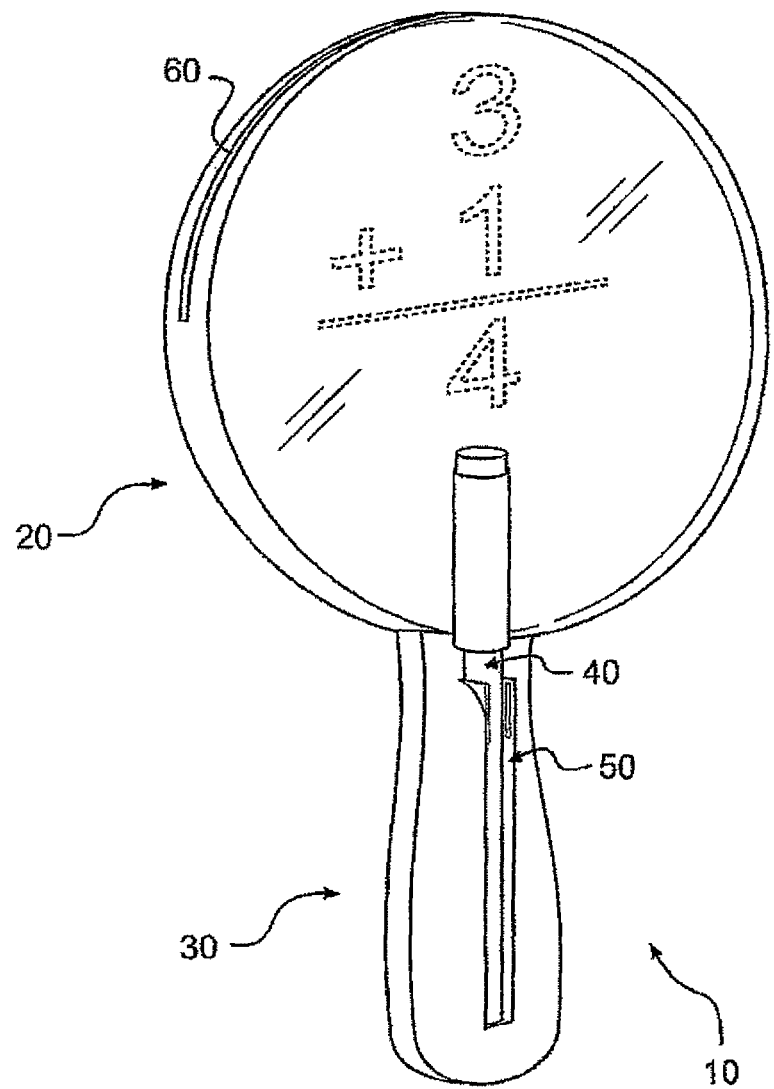
FIG. 7 is a perspective view of the hand-held dry-erase board system including the printable substrate.
Figure 8:
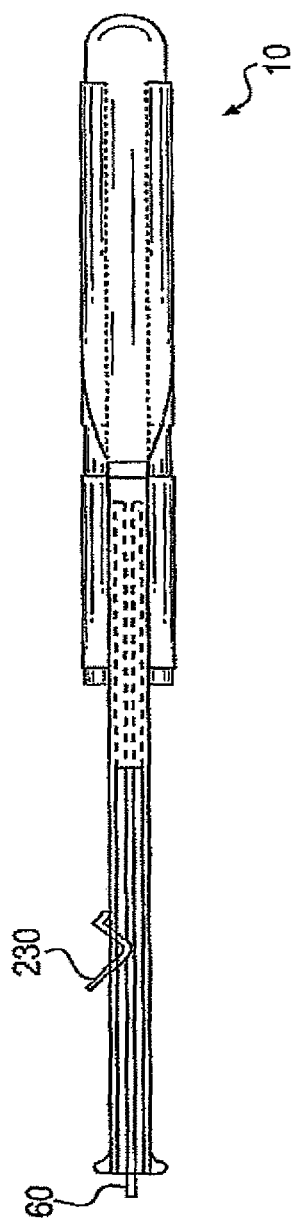
FIG. 8 is a side view of an embodiment with a retainer for the printable substrate.

The handle 30 may include at least one clip 50 on the same side of the hand-held dry-erase board system 10 as the first writable surface 22, where the clip 50 removeably securely holds at least one marker unit 40, as shown in FIGS. 1 through 3. The handle 30 is optionally formed to include a clip 50 on both sides of the handle 30 to allow the user to removeably secure more than one marker unit 40 to the hand-held dry-erase board system 10 as illustrated in FIGS. 3 through 5. A portion of the handle 30 defines a recessed notch 49 extending along the handle and the clip 50 is disposed along about the notch 49 so as to retain the writing instrument within the notch 49. The notch 49 is closed at the distal end 34 of the handle 30.

The clip 50 preferably includes a first rib 52 and a second rib 54. The first rib 52 and the second rib 54 are preferably of a substantially similar structure and configuration and essentially parallel to each other along the handle 30. The first rib 52 and the second rib 54 are preferably comprised of channel structures that extend into the handle 30, as not to be in the way from gripping the handle 30, as shown in FIGS. 1 through 5. A writing instrument or marker unit 40 is allowed to fit in-between the first rib 52 and the second rib 54. The portion of the clip 50 furthest below the outer surface of the handle 30 is preferably coplanar with the edge of the first writable surface 22 as shown in FIG. 5. In this way, the marker unit 40 rests in a horizontal position within the clip 50 when the hand-held dry-erase board system 10 is laid on a horizontal surface, such as a table or a desk.

The clip 50 may embed the marker unit 40 within the profile of the handle 30 defining a cavity 56 with the cavity 56 being below the surface of the handle 30 which may allow the marker unit 40 to reside outside the profile of the handle 30 or any combination thereof.

The first rib 52 preferably includes a first locking member 53 and the second rib 54 preferably includes a second locking member 55. The first locking member 53 and the second locking member 55 are preferably positioned towards the proximal end 32 of the handle 30 and medial to the clip 50. The first locking member 53 and the second locking member 55 extend towards one another to create a slightly smaller width between the first locking member 53 and the second locking member 55 than the width between the first rib 52 and the second rib 54 near the distal end 34 of the handle 30. This to provide a secure holding place for the marker unit 40, when the marker handle 42 is in the clip 50, as shown in FIG. 1.

D. Marker Unit

The marker unit 40 is preferably a writing instrument of a structure and configuration of a dry-erase marker. The marker unit 40 includes a writing tip 44 and the marker handle 42, as shown in FIG. 2. The writing tip 44 is used to write on the first writable surface 22 and the second writable surface 24. The marker unit 40 also preferably includes a cap 46, where the cap 46 connects to the marker handle 42 and covers the writing tip 44 from outside elements. It is also appreciated that the marker unit 40 may be comprised of a configuration rather than a dry erase marker, such as but not limited to a chalk configuration or pencil configuration.

The cap 46 may also include an eraser 48, as shown in FIGS. 1, 2 and 5. The eraser 48 is preferably, but not necessarily, positioned at the top of the cap 46 at the furthest point from the marker handle 42. The eraser 48 is preferably of a structure and configuration to erase writing on the first writable surface 22 and the second writable surface 24 from the writing tip 44. The eraser 48 is preferably comprised of a configuration of a standard dry erase board eraser; however it is appreciated that the eraser 48 may be comprised of various configurations rather than the shown embodiment, such as but not limited to a chalk board eraser configuration or pencil eraser configuration.

Printable Substrate

The channel or aperture 210 allows for the insertion of at least one printable substrate 60 into the compartment 205. The printable substrate 60 may be of Mylar, paper, fabric or film or any printable surface that is generally in the form of a sheet. The printable substrate 60 is of a shape and size and width to fit conveniently within the channel or aperture 210 and internal compartment 205 within the hand-held dry-erase board system 10 and is generally visibly distinguishable through the first writable surface 22 and/or the second writable surface 24. The printable substrate surface 60 may be a blank, have a pattern, design or contain information. The printable substrate 60 is insertable and removeable through the aperture 210 and into internal compartment 205 and may be secured by friction, elasticity, a barrier, a clip, semi-permanent adhesive or by design of the printable substrate 60. Optionally, at least a portion of substrate 60 may be printed or embossed with to include a computer readable medium 64 (See, e.g., FIG. 16), such as a data matrix code or some other code. Optionally, handle 30 or frame 20 may include such a code, if desired for inventory tracking, communication, advertising, etc.

E. Operation

The user first grasps the handle 30 in a way to not cover the marker unit 40. The marker unit 40 is then removed from the first locking member 53 and the second locking member 55 of the clip 50 by pulling the marker unit 40 longitudinally or by applying an angular force. The cap 46 from the marker unit 40 is then removed from the marker handle 42. The user may then firmly grasp the marker handle 42 and write a question (e.g., "3+1=_____"), using the writing tip 44, on the first writable surface 22, as shown in FIG. 3. The user may also write the appropriate answer to the given question, at this time, on the second writable surface 24 (e.g., "3+1=4"), as shown in FIG. 4.

In another manner, the user may insert the printable substrate 60 within the aperture or channel 210 and internal compartment 205 to act as a barrier between the first writable surface 22 and the second writable surface 24. The printable substrate 60 may have the question (e.g., "3+1=_____") preprinted on it that is visible through the substantially transparent first writable surface 22 and second writable surface 24. The answer to the question may be preprinted on the back of the printable substrate 60 facing the second writable surface 24 or may be blank. The user, then may write the answer (e.g. "4") on the second writable surface 24 for viewing or may write the answer on the first writable surface 22 as in this example (e.g., "3+1=4"). In this manner the printable substrate 60 remains clear of marks from the user and can be used many times over.

The printable substrate 60 may be held within the handheld dry-erase board system 10 by friction, gravity, electrostatic forces, elasticity, barrier, clip, semi-permanent adhesive or by other mechanical design. The design of the printable substrate 60 may have a tab that may be folded over to provide sufficient friction to hold the printable substrate 60 in place.

The user then replaces the cap 46 back on the marker handle 42 and then places the marker handle 42 back into the first locking member 53 and the second locking member 55 of the clip 50. The user now holds up the hand-held dry-erase board system 10 for at least one individual to view. This is done in a manner so that the viewer(s) may only see the first writable surface 22 of the hand-held dry-erase board system 10.

Once an individual guesses the answer to the question the user may turn around the hand-held dry-erase board system 10 to reveal the second writable surface 24 and the answer to the question. The user may now remove the marker unit 40 from the first locking member 53 and the second locking member 55 of the clip 50, and rub the eraser 48 over the writing on the first writable surface 22 and the second writable surface 24. The eraser 48 erases the writing on the first writable surface 22 and the second writable surface 24 so that the user may now write a new question for viewing. Every individual in the group may also utilize the handheld dry-erase board system 10 to respond to the users question with their individual response. To write a new question, the above process is simply repeated or a new printable substrate 60 may be inserted in the channel 210 and internal compartment 205 with a new question.

When the user has written a question or answer, the hand-held dry-erase board system 10 may be laid horizontally on a surface. The stabilizing protrusions 23 form at least one point in conjunction with the handle 30 to prevent the first writable surface 22 or second writable surface 24 from contacting the surface and damaging the writing.

Figure 16:
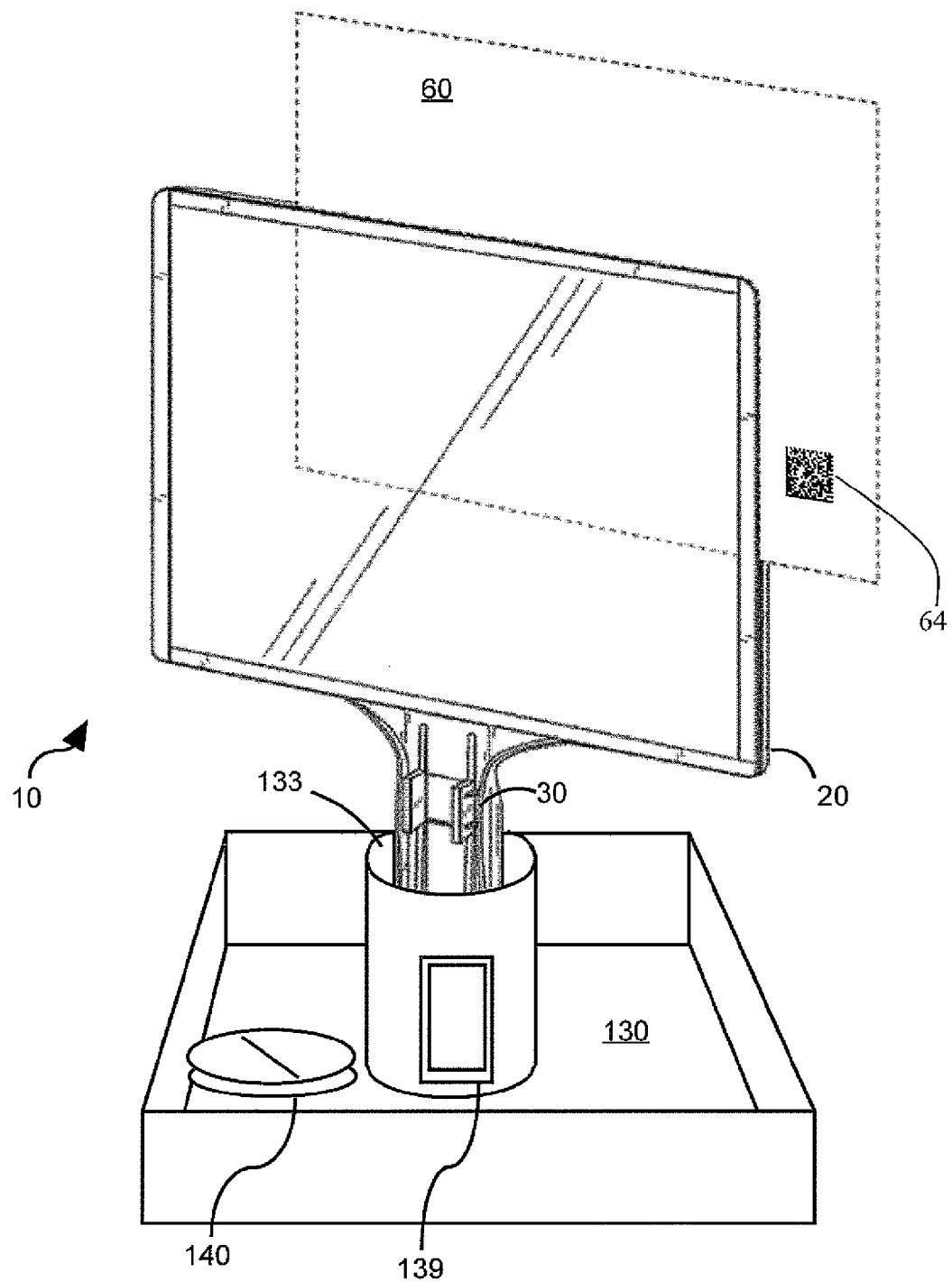
FIG. 16 is a front view of an embodiment of a writing kit.

As shown in FIG. 16, embodiments may be provided in the form of a writing kit having a hand held writing system 10 with a tray 130, as described further below. As described above, the hand held writing system 10 is intended for use with a writing instrument. The system 10 may have a frame 20 (see FIG. 2) with a height along a Y-axis, a width along an X-axis, and a depth along a Z-axis. The frame 20 may define at least one substantially planar writable surface 22 along a portion of the frame's height and width, the frame further defining a side surface 28 along the frame's depth at a perimeter of the writable surface. There is a handle 34 with at least one proximal end and at least one distal end, wherein the proximal end of the handle is attached to the frame 20 at a point on the frame 20 other than the substantially planar writable surface 22, with the at least one distal end extending unattached to the frame 20 substantially parallel to the Y-axis and forming an ergonomic gripping surface apart from the frame 20. The handle 30 and its ergonomic gripping surface may be adapted to being encircled by a user's hand in a power grip (see, e.g., FIG. 12), with the frame 20 and the handle 30 defining a paddle-like shape.

With reference to FIG. 16, the kit may include tray 130 having a tray bottom and at least one tray side, the tray bottom and at least one tray side defining a container with an open top. The bottom of tray 130 may inherently have an inner bottom surface and an outer bottom surface. The tray 130 may include a handle mount 133 integrally affixed to the inner bottom surface of tray 130, and extending vertically. Handle mount 133 may be configured to engage with the handle 30 so as to enable the handle 30 and frame 20 to be supported in a substantially vertical orientation from the tray 130.

A writing kit may include the variations and optional embodiments of system 10 disclosed herein. For example, the proximal end of the handle 30 may be attached to a bottom of the frame 20 at a midpoint of the width of frame 20, and the handle 30 may be a substantially I-shaped member extending along the Y-axis (see, e.g., FIG. 2), and at least a portion of the handle 30 may have substantially rounded corners capable of being encircled by the user's hand in a power grip (see, e.g., FIG. 12). Optionally, the at least one substantially planar writable surface 22 may comprise two opposing sides having a common side surface, so as to form a first writable surface and a second writable surface on opposite sides of the frame.

The writing kit may include a system 10 in which at least a portion of the at least one writable surface is substantially transparent. Optionally, versions of such kit may be adapted for use with a substrate 60, with the substrate 60 having a predetermined substrate height, width, depth, and a substrate presentation surface. The handheld writing system 10 may include a substantially planar, flexible, transparent sleeve having an outer surface that is the at least one writable surface 22. The transparent sleeve may overlay frame 20 with an inner surface facing the frame 20. The sleeve having an affixed edge portion affixed to the frame 20 and a free edge portion 220 that is un-affixed to the frame 20. The sleeve and the frame 20 define an internal compartment having a desired compartment-height, compartment-width, and compartment-depth greater than the height, width, and depth of substrate 60.

In this way, the free edge portion 220 of the transparent sleeve forming the at least one writable surface 22, with frame 20, defines an aperture 210 within the side surface. This aperture 210 is in fluid communication with the internal compartment and configured for insertion of the substrate 60 through the aperture 210 and into the internal compartment (see, e.g., FIG. 16.) When the substrate 60 is inserted into the internal compartment with the presentation surface facing away from the frame 20 (substantially parallel with the at least one writable surface 22), the presentation surface is substantially parallel with the at least one writable surface 22 so that the substrate 60 is visible through the at least one writable surface 22 (see, e.g., FIG. 12).

Such a writing kit may include a dry-erase marker and wherein said writable surface 22 is comprised of a material suitable for writing upon with the dry-erase marker. In addition, the kit may include a dry-erase eraser. The writing kit may be configured so that the open top of the tray 130 operably engages the frame 20 so that the frame 20 and tray 130 mate closing the open top of the tray 130. This engagement may be by fasteners, clips, inter-locking tongue and groove members, etc. Tray 130 may include a storage receptacle 139 for removable storage of a portable computer readable medium, such as a portable USB drive or other non-transient computer readable medium. In some embodiments, storage receptacle 139 may be disposed on writing system 10, such as the handle 30 (not shown). Further, the writing system 10 or tray 130 may include a computer readable medium 64, such as the data matrix code shown in FIG. 16 on template 60.

Given the suitability of system 10 for use with shared decision making in health care, an optional embodiment may be in the form of a patient caregiver communication kit. This approach is intended to be a patient focused form of writing kit, while enhancing communication with caregivers. As noted above, this may support shared decision making. The patient may use the system 10 to communicate with care givers. Substrate 60 may be customized to the metrics relevant to a particular health condition or course of treatment. Further, tray 130 may be adapted to contain personal items 140, such as a cell phone, hearing device, dentures, etc. In the event the patient has difficulty with memory, a patient may write down a reminder. A computer readable medium 64 (such as a portable USB drive, for example) may be included. Such a medium may provide an instruction video, health literature, physician audio or visual instructions, an electronic health record, a course of rehabilitative treatment or medication regimen, links to such items or other online resources, etc. In another embodiment, a care facility might print substrates 60 bearing a computer readable medium 64, such as a bar code or data matrix code code, bearing relevant information to healthcare professionals, including a link to an electronic record. Data matrix codes may be provided by a healthcare professional, a teacher, a hospital or school, a sponsor or advertiser, distributor, etc. In some cases, a bank or library of substrates 60 may be provided by a distributor, and users may optionally have the ability to edit such substrates 60 or add such computer readable medium 64. In other cases, substrates 60 may be customizable for the application.

With respect to computer media, any suitable non-transient computer readable medium may be utilized. The computer-usable or computer-readable medium may be, for example but not limited to, an electronic, magnetic, optical, electro-magnetic, infrared, or semiconductor system, apparatus, or device. More specific examples (a non-exhaustive list) of the non-transient computer-readable medium would include the following: a portable computer diskette, a hard disk, a random access memory (RAM), a read-only memory (ROM), an erasable programmable read-only memory (EPROM or Flash memory), or a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. For example, a barcode, data matrix code, or equivalents might be provided as a computer readable medium 64 to convey computer readable information. In the context of this document, a computer-usable or computer-readable medium may be any non-transient medium that can contain, store, communicate, propagate, or transport the program for use by or in connection with the instruction execution system, apparatus, or device.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

What is claimed is:

1. A hand-held writing system for use with a writing instrument, the system comprising:
   a frame having a height along a Y-axis, a width along an X-axis, and a depth along a Z-axis, wherein the frame defines at least one substantially planar writable surface along a portion of the frame's height and width, the frame further defining a side surface along the frame's depth at a perimeter of the writable surface;
   a handle having at least one proximal end and at least one distal end, wherein the proximal end of the handle is attached to the frame at a point on the frame other than the substantially planar writable surface, with the at least one distal end extending unattached to the frame substantially parallel to the Y-axis and forming an ergonomic gripping surface apart from the frame, the handle and ergonomic gripping surface adapted to being encircled by a user's hand in a power grip; and
   wherein the frame and the handle are embodied in a general shape of a paddle.

2. The hand-held writing system as in claim 1, wherein the proximal end of the handle is attached to a bottom of the frame at a midpoint of the frame's width and the handle is a substantially I-shaped member extending along the Y-axis, and at least a portion of the handle has substantially rounded corners capable of being encircled by the user's hand in a power grip.

3. The hand-held writing system according to claim 1, wherein the at least one substantially planar writable surface comprises two opposing sides having a common side surface, so as to form a first writable surface and a second writable surface on opposite sides of the frame.

4. The hand-held writing system according to claim 1, wherein at least a portion of the at least one writable surface is substantially transparent.

5. The hand-held writing system of claim 4, wherein the system is adapted for use with a substrate having a predetermined substrate height, width, depth, and a substrate presentation surface, wherein the system further comprises:
   a substantially planar, flexible, transparent sleeve having an outer surface that is the at least one writable surface, the transparent sleeve overlaying the frame with an inner surface facing the frame, the sleeve an affixed edge portion affixed to the frame and a free edge portion that is un-affixed to the frame, the sleeve and the frame defining an internal compartment having a desired compartment-height, compartment-width, and compartment-depth greater than the substrate-height, substrate-width, and substrate-depth;

the free edge portion of the transparent sleeve and the frame define an aperture in fluid communication with the internal compartment and configured for insertion of the substrate through the aperture and into the internal compartment; and wherein, when the substrate is inserted into the internal compartment with the presentation surface facing away from the frame and substantially parallel with the at least one writable surface, the presentation surface of the substrate is visible through the at least one writable surface.

6. The hand-held writing system as in claim 5, wherein the perimeter of the writable surface adjacent to the aperture defines at least one access depression within the perimeter along the X- and Y-axes, so as to provide access to a portion of the substrate after the substrate has been inserted through the aperture and into the internal compartment.

7. The hand-held writing system of claim 1, wherein the handle further comprises a maximum effective diameter greater than an average depth of the frame, the frame further comprises at least one stabilizing protrusion extending along the Z-axis for a desired distance substantially equivalent to the distance beyond the writable surface along the Z-axis of the handle at a point of maximum effective diameter, and wherein the at least one stabilizing protrusion is positioned on the perimeter of the writable surface at a point opposing the distal end of the handle.

8. The hand-held writing system according to claim 1, wherein the at least one substantially planar writable surface comprises two opposing sides having at least a portion of common perimeter along a plane substantially parallel with the X and Y-axes, wherein the perimeter forms a desired shape.

9. The hand-held writing system according to claim 1, wherein the handle has a substantially flat contact surface positioned so as to rest between a thumb and index finger of a user gripping the handle.

10. The hand-held writing system according to claim 2, wherein the frame depth has a thickness of about 0.25-1 inch.

11. The hand-held writing system according to claim 10, wherein the handle has a cross section diameter of about 1 inch to 2 inches.

12. The hand-held writing system according to claim 11, wherein the handle has a height of about 4 inches to about 6 inches.

13. The hand-held writing system of claim 1, wherein said writing instrument is comprised of a dry-erase marker and wherein said writable surface is comprised of a material suitable for writing upon with said dry-erase marker.

14. The hand-held writing system according to claim 13, further comprising a dry-erase eraser.

15. The hand-held writing system according to claim 1, further comprising a computer readable medium.

16. A writing kit, the kit comprising:
(i) a hand held writing system for use with a writing instrument, the system having
a frame with a height along a Y-axis, a width along an X-axis, and a depth along a Z-axis, wherein the frame defines at least one substantially planar writable surface along a portion of the frame's height and width, the frame further defining a side surface along the frame's depth at a perimeter of the writable surface,
a handle with at least one proximal end and at least one distal end, wherein the proximal end of the handle is attached to the frame at a point on the frame other than the substantially planar writable surface, with the at least one distal end extending unattached to the frame substantially parallel to the Y-axis and forming an ergonomic gripping surface apart from the frame, the handle and ergonomic gripping surface adapted to being encircled by a user's hand in a power grip,
wherein the frame and the handle are embodied in a general shape of a paddle;
(ii) a tray having a tray bottom and at least one tray side, the tray bottom and at least one tray side defining a container with an open top, the tray bottom having an inner bottom surface and an outer bottom surface, the tray having a handle mount integrally affixed to the inner bottom surface and extending vertically, configured to engage with the handle so as to enable the handle and frame to be supported in a substantially vertical orientation from the tray.

17. The writing kit as in claim 16, wherein the proximal end of the handle is attached to a bottom of the frame at a midpoint of the frame's width and the handle is a substantially I-shaped member extending along the Y-axis, and at least a portion of the handle has substantially rounded corners capable of being encircled by the user's hand in a power grip.

18. The writing kit as in claim 16, wherein the at least one substantially planar writable surface comprises two opposing sides having a common side surface, so as to form a first writable surface and a second writable surface on opposite sides of the frame.

19. The writing kit as in claim 16, wherein at least a portion of the at least one writable surface is substantially transparent.

20. The writing kit as in claim 16, wherein the kit is adapted for use with a substrate having a predetermined substrate height, width, depth, and a substrate presentation surface, wherein:
the handheld writing system further comprises a substantially planar, flexible, transparent sleeve having an outer surface that is the at least one writable surface, the transparent sleeve overlaying the frame with an inner surface facing the frame, the sleeve having an affixed edge portion affixed to the frame and a free edge portion that is un-affixed to the frame, the sleeve and the frame defining an internal compartment having a desired compartment-height, compartment-width, and compartment-depth greater than the substrate-height, substrate-width, and substrate-depth;
the free edge portion of the transparent sleeve and frame defines an aperture within the side surface, the aperture in fluid communication with the internal compartment and configured for insertion of the substrate through the aperture and into the internal compartment; and
wherein, when the substrate is inserted into the internal compartment with the presentation surface facing away from the frame and substantially parallel with the at least one writable surface, the internal compartment includes an internal presentation surface that is substantially parallel with the at least one writable surface, so that of the substrate is visible through the at least one writable surface.

21. The writing kit of claim 16, further comprising a dry-erase marker and wherein said writable surface is comprised of a material suitable for writing upon with said dry-erase marker.

22. The writing kit of claim 21, further comprising a dry-erase eraser.

23. The writing kit of claim 16, wherein the open top of the tray operably engages the frame so that the frame and tray mate closing the open top of the tray.

24. The writing kit of claim 16 wherein the tray defines a storage receptacle for removable storage of a portable computer readable medium.

25. The writing kit of claim 24 further comprising a portable non-transient computer readable medium.

26. The writing kit of claim 16 further comprising a computer readable medium.

\* \* \* \* \*